United States Patent [19]
Hagerman

[11] Patent Number: 5,461,430
[45] Date of Patent: Oct. 24, 1995

[54] DYNAMIC GAMMA CORRECTION CIRCUIT FOR USE IN IMAGE PROJECTORS

[76] Inventor: James G. Hagerman, 5137 Camino Playa Malaga, San Diego, Calif. 92124

[21] Appl. No.: 116,413

[22] Filed: Sep. 3, 1993

Related U.S. Application Data

[63] Continuation-in-part of Ser. No. 986,108, Dec. 4, 1992, abandoned.

[51] Int. Cl.$^6$ .................................... H04N 5/202
[52] U.S. Cl. ............................... 348/674; 348/744
[58] Field of Search ...................... 348/674, 254, 348/744, 745; 358/164, 32; H04N 5/20, 5/202

[56] References Cited

U.S. PATENT DOCUMENTS

| | | | |
|---|---|---|---|
| 3,708,693 | 1/1973 | Ferrier et al. | 358/164 |
| 4,847,524 | 7/1989 | Van Rooy et al. | 358/164 |
| 4,868,668 | 9/1989 | Tavernetti | 358/237 |

FOREIGN PATENT DOCUMENTS

| | | | |
|---|---|---|---|
| 155884 | 9/1982 | Japan | 358/164 |
| 45775 | 3/1984 | Japan | 358/32 |
| 67784 | 4/1984 | Japan | 358/164 |
| 257674 | 12/1985 | Japan | 358/164 |
| 112479 | 5/1987 | Japan | H04N 5/202 |
| 260976 | 10/1990 | Japan | H04N 5/202 |
| 91375 | 4/1991 | Japan | H04N 5/202 |
| 186071 | 8/1991 | Japan | H04N 5/202 |
| 351071 | 12/1992 | Japan | H04N 5/202 |

Primary Examiner—James J. Groody
Assistant Examiner—Chris Grant

[57] ABSTRACT

Apparatus that implements a nonlinear transfer function (gain) that provides for gamma correction of nonlinear image projectors. The nonlinearity of the transfer function is designed to compensate for the nonlinearity of a nonlinear light modulator, such as a liquid crystal light valve and cathode ray tube combination, for example, that is used in the image projector. The gamma correction circuit comprises a plurality of amplifiers that include current sources coupled together to sum their output currents, and each amplifier is adapted to implement a predetermined transfer function, and provide differing levels of current. An optional output resistor may be employed to convert the composite output current into a corresponding output voltage. Each of the plurality of amplifiers typically comprises first and second emitter coupled pair transistors plus their associated current sources. The present invention corrects the grey scale linearity of the image projector in which it is employed. The amplifier configuration of the circuit does not use feedback, so its processing bandwidth remains high. The present invention also produces "soft" breakpoints, creating a relatively smooth transfer function. The gamma correction circuit of the present invention is useful in any application using a nonlinear amplifier. The present gamma correction circuit may also be used in any image projector or display using liquid crystal or other nonlinear imaging technology. If gamma correction is used in conjunction with dynamic threshold correction then the gamma correction is made dynamic by adding the threshold correction signal to the base of one of the transistors in the gamma correction circuitry.

19 Claims, 14 Drawing Sheets

DYNAMIC GAMMA CORRECTION CIRCUIT FOR USE IN IMAGE PROJECTORS

This application is a continuation-in-part application of abandoned prior application Ser. No. 07/986,108, filed Dec. 4, 1992 entitled "Gamma Correction Circuit for Use in Image Projectors", naming as inventor James G. Hagerman.

BACKGROUND OF THE INVENTION

The present invention relates generally to nonlinear light modulators and image projectors, and more particularly, to gamma correction circuits for use with nonlinear light modulators and image projectors that correct the grey scale linearity of images displayed thereby.

Gamma correction circuits are used to correct the grey scale linearity of image projectors in which they are employed. If a gamma correction circuit is not used, the grey scale linearity of the image projector is relatively poor, causing video images to look "washed out" and have poor color rendition. In particular, the gray scale is nonlinear or unbalanced, and this translates into fewer shades of gray, which may be insufficient to provide a good quality image.

Previously implemented gamma correction circuits have been based on the use of diode circuits. The diode-based circuits are generally disadvantageous because of higher voltage swings are required to compensate for diode voltage drops. This reduces bandwidth and consumes more power. There are sharp breakpoints caused by the diode-based correction circuits that result in a somewhat discontinuous transfer functions. The diode-based correction circuits are not temperature compensated. The diode voltage drop changes with temperature causing a shift in the breakpoint. The diode-based correction circuits also have a lower bandwidth if the diodes are used in a feedback configuration. Such feedback configurations may fix the temperature drift problem, but breakpoints are even sharper causing transfer functions to be discontinuous.

Previous implementations of gamma correction circuits have also employed digital techniques using A/D converters, a memory, and D/A converters. These circuits are relatively costly to build, especially if high speed and large bandwidth circuits are desired. Another problem arises when gamma correction is used in conjunction with dynamic threshold correction. Since some areas of the light valve require more light from the CRT to turn on then other areas and since the turn on point for each area on the light valve may be different due to the manufacturing process, threshold correction is required for various areas on this input surface of the light valve. However, when different threshold biases are used, the various areas of the liquid crystal light valve operate on different parts of the CRT drive curve. Since these points are redefined as zero or the black level then the gamma correction will be offset from the point where it should start. This can cause degradation of the projector output. It would be advantageous to account for or correct the effect of the threshold correction voltage on the gamma correction circuitry.

Consequently, it would be an improvement in the art to have an image light projector employing a gamma correction circuit that eliminates the above-mentioned problems associated with conventional diode-based and digital gamma correction circuits.

SUMMARY OF THE INVENTION

The present invention is an electronic circuit that implements a nonlinear system transfer function (gain) that provides for gamma correction of an image projectors, and nonlinear light modulators in particular. The nonlinearity of the gamma correction circuit is designed to compensate for the nonlinearity of the light modulator or image projector. One embodiment of the gamma correction circuit has been built for use with a liquid crystal light valve image projector. The nonlinearity of this specific gamma correction circuit compensates for the nonlinearity of a liquid crystal light valve and an image source (cathode ray tube, for example) employed in the image projector.

In general, the present gamma correction circuit provides a means for correcting the system transfer function of any system employing nonlinear control. Such systems may include sine wave shaping circuits, logarithmic amplifiers, liquid crystal based systems, analog sensor systems, such as a thermocouple-based transducer, for example, deflection circuits requiring linearity correction, and feedback circuits requiring linearity control. The present gamma correction circuit may be used with other nonlinear devices such as deformable membranes or piezoelectric light transducers, for example.

More specifically, the gamma correction circuit of the present invention comprises a plurality of amplifiers that are coupled together to sum their respective output currents to provide a composite output current. Each of the plurality of amplifiers typically comprises first and second emitter coupled pair transistors. Each of the plurality of amplifiers is adapted to implement a predetermined transfer function. A plurality of current sources are coupled to respective ones of the plurality of amplifiers to provide differing levels of current to the respective amplifiers. The plurality of current sources cooperate with the plurality of amplifiers to provide each predetermined transfer function. Optionally, an output resistor is adapted to convert the composite output current into a corresponding output voltage of the circuit. The combination of amplifiers and current sources is configured to compensate for nonlinearity of the image projector due to the combination of the cathode ray tube and the liquid crystal light valve.

The primary application for the present gamma correction circuit has been developed is in liquid crystal light valve-based image projectors, but it may also be adapted for other uses related to video image projection. When used in a liquid crystal light valve projector, the nonlinear transfer function of the present gamma correction circuit combines with the response functions of the liquid crystal light valve and a cathode ray tube used to input images to the liquid crystal light valve, and produces a system transfer function equivalent to that of the cathode ray tube alone.

Specifically, the present invention produces a nonlinear gain function by summing the collector current derived from the plurality of interconnected emitter coupled pair amplifiers. The present invention corrects the grey scale linearity of the image projector in which it is employed. The amplifier configuration of the present gamma correction circuit does not require feedback, so its processing bandwidth remains high. The present gamma correction circuit also has "soft" breakpoints, creating a relatively smooth transfer function.

The gamma correction circuit of the present invention is useful in applications requiring a nonlinear amplifier. In particular, the present gamma correction circuit is adapted for use in the Model 300 projector manufactured by the assignee of the present invention. The present gamma correction circuit may also be used in any projector or display using liquid crystal (or other nonlinear) imaging technology.

A further improvement of the present invention involves dynamic gamma correction for a liquid crystal light valve based image projector that has threshold compensation. In this type of projector the light valve threshold point varies across the input surface of the liquid crystal light valve. To compensate for the change in turn on threshold, more CRT drive light is used. This is called threshold bias. The areas on the liquid crystal light valve that require more light to turn on also operate at a higher point on the CRT drive curve. For some areas on the liquid crystal light valve input surface, the turn on point is actually further up the CRT curve than normal. If this point is redefined as zero or the black level, then the shape of the gamma correction curve will be altered from point where it should start. To compensate for this, the threshold correction voltage is applied to the base of one of the transistor amplifiers in the gamma correction circuitry to dynamically alter the shape of the gamma correction curve so that the system transfer function will be closer to the desired response when dynamic threshold correction is used.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3b shows the response of the circuit of FIG. 3a;

FIG. 4b shows the response of the circuit of FIG. 4a;

FIG. 5b shows the response of the circuit of FIG. 5a;

FIG. 6b shows the response of the circuit of FIG. 6a;

FIG. 7b shows the transfer function of the gamma correction circuit of FIG. 7a;

FIG. 8b shows the transfer function of the gamma correction circuit of FIG. 8a;

FIG. 9b shows the transfer function of the gamma correction circuit of FIG. 9a;

DETAILED DESCRIPTION

Figure 1:
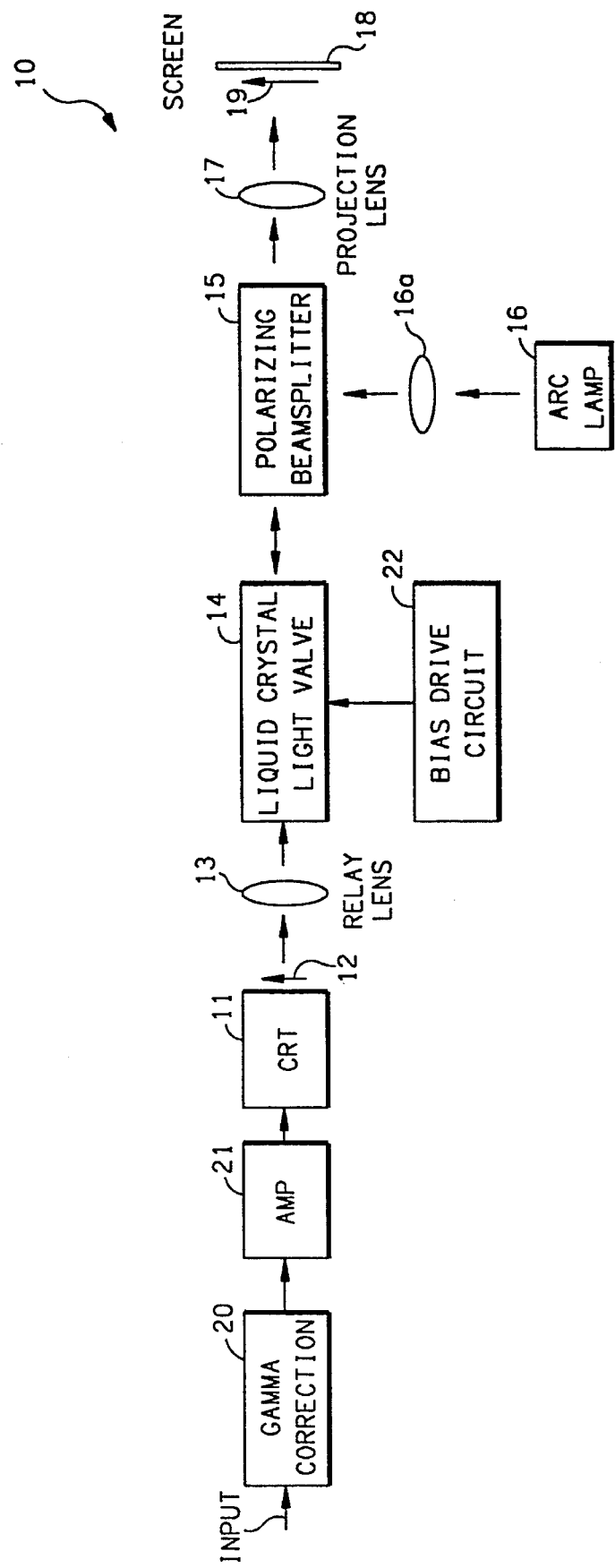
FIG. 1 shows the primary display components of a liquid crystal light valve image projector in which the present invention is employed.

Referring to the drawing figures, FIG. 1 shows the primary display components of a liquid crystal light valve image projector 10 in which a gamma correction circuit 20 in accordance with the principles of the present invention is employed. Although the present invention will be described with reference to the liquid crystal light valve image projector 10, it is to be understood that it may be employed for use with any nonlinear light modulator or image projector, and is not limited to use with only liquid crystal light valve image projectors.

The image projector 10 is generally comprised of a cathode ray tube (CRT) 11 that provides an image 12 that is to be displayed by the image projector 10. A relay lens 13 is adapted to focus the image 12 on an input surface of a liquid crystal light valve 14. A bias drive circuit 22 is adapted to drive the liquid crystal light valve 14 to control its output.

An arc lamp 16 is focused by a lens 16a onto a polarizing beamsplitter 15 that transfers light from the arc lamp 16 onto an output surface of the liquid crystal light valve 14. This light is reflected from the output surface of the liquid crystal light valve 14 and back through the polarizing beamsplitter 15. The image 12 is "transferred" by the liquid crystal light valve 14 to the light provided by the arc lamp 16. A projection lens 17 then images the reflected light onto an image screen 18 which provides a replication of the image 12 as an image 19 that is viewable by an observer. In general, the design and operation of the liquid crystal light valve 14 and image projector 10 are well-known in the art.

Figure 2A:
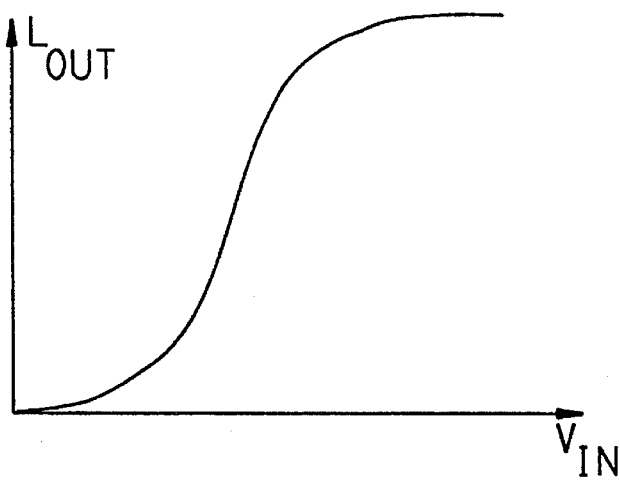
FIG. 2a shows a response curve of the light output versus voltage of the combination of the cathode ray tube and the liquid crystal light valve employed in the image projector of FIG. 1.

The gamma correction circuit 20 of the present invention is adapted to receive an input drive signal that comprises an input video signal derived from a video tape recorder, for example. The gamma correction circuit 20 is coupled by way of an amplifier 21 to an input of the cathode ray tube 11. The amplifier 21 is adapted to provide a gain stage for increasing the signal strength of the output of the gamma correction circuit 20 prior to its application to the cathode ray tube 11. The gamma correction circuit 20 is adapted to generate a nonlinear transfer function using several emitter coupled pair amplifiers whose collectors are tied together. This will be described in detail below with reference to FIG. 10. By tying the collectors of the emitter coupled pair amplifiers together, the output of the gamma correction circuit 20 is the sum of currents from each amplifier stage, which forms a composite response. To understand the present invention more fully, background material is presented below. The response of the liquid crystal light valve 14 is not linear. It is a light amplification device that works by "programming" its input side with an image that modulates a variable mirror on the output side of the device. This mirror reflects varying amounts of projection light provided by the arc lamp 16 thus creating a light amplifier. The image on the input side of the liquid crystal light valve 14 is applied using the cathode ray tube 11. The transfer function of the cathode ray tube 11 and liquid crystal light valve 14 combination between the input and output is shown in FIG. 2a. As is seen in FIG. 2a, the transfer function is very nonlinear.

Figure 2B:
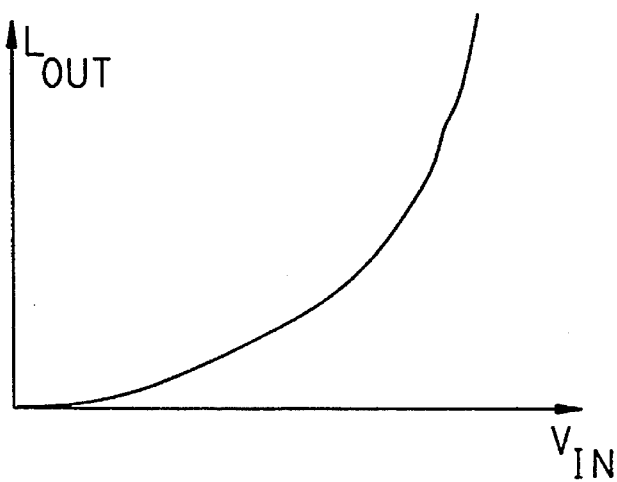
FIG. 2b shows a response curve of the light output versus voltage of the cathode ray tube of FIG. 1.
Figure 2C:
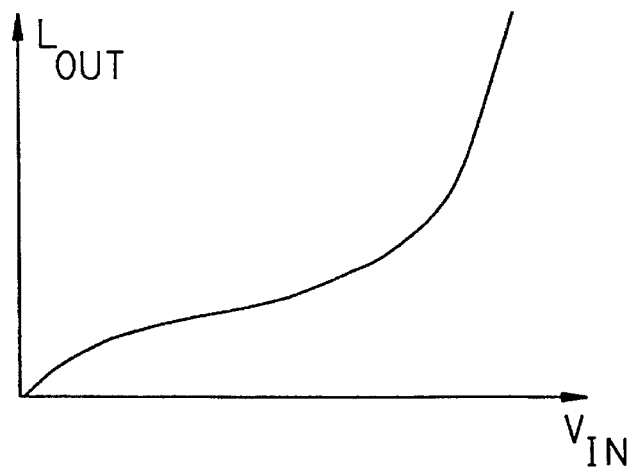
FIG. 2c shows a desired response curve of light output versus voltage provided by the gamma correction circuit of the present invention.

An image projector 10 built using a cathode ray tube 11 and liquid crystal light valve 14 combination needs to have its transfer function corrected. Video signals for broadcast, or from any conventional source, are normally pre-corrected for the response of the cathode ray tube 11. The transfer function for cathode ray tube 11 is shown in FIG. 2b. The transfer function is approximately equal to VIN to the power of 2.5 (VIN2.5). For proper grey scale imagery, the image projector 10 should have the transfer function shown FIG. 2b. To make an image projector 10 having proper display characteristics, and when employing the cathode ray tube 11 and liquid crystal light valve 14 combination, gamma correction is used. Referring again to FIG. 1, a video input signal is corrected using a nonlinear amplifier implemented in the present gamma correction (compensation) circuit 20, such that when the video input signal is applied to the cathode ray tube 11 and liquid crystal light valve 14 combination, the transfer function of the entire system is correct, and has the shape shown in FIG. 2b. FIG. 2c shows the correction function that is provided by the present gamma correction circuit 20, and that is necessary to produce the system transfer function of FIG. 2b**.

Figure 3A:
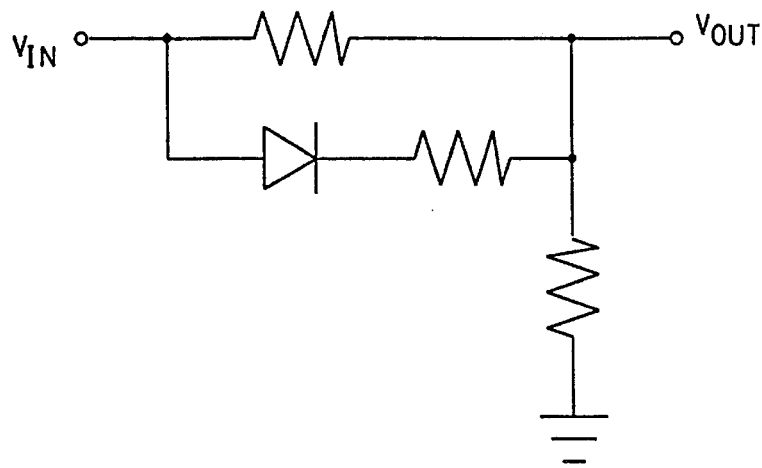
FIG. 3a shows a conventional diode resistor amplifier circuit used to create the transfer function shown in FIG. 2c.
Figure 3B:
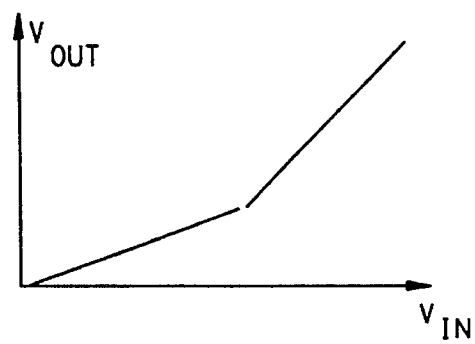
Figure 4A:
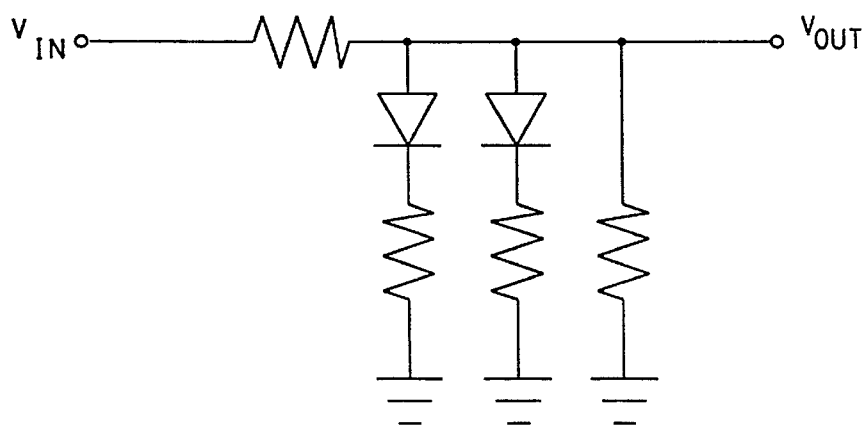
FIG. 4a shows a second conventional diode resistor amplifier circuit used to create the transfer function shown in FIG. 2c.
Figure 4B:
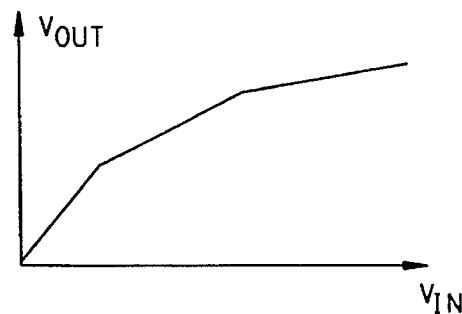

There are several conventional ways to create a gamma correction circuit that produces the system transfer function shown in FIG. 2c, but the system transfer functions are produced with varying degrees of success. FIG. 3a is a simple diode resistor example, which has the nonlinear response shown in FIG. 3b. The circuit shown in FIG. 4a is another example, and its response curve is shown in FIG. 4b. The problem with these two circuits is that the breakpoint shifts with temperature because of the diodes used therein. Also, if breakpoints need to occur at a low VIN, then a high maximum VIN is needed. The lowest available diode drop is about 0.3 volts using a germanium or Schottky diode. If the first breakpoint is at 10% VIN, then the maximum signal VIN is about 3 volts. This is difficult to achieve for fast amplifiers. To keep the signal path fast, low impedance devices must be used and this also requires a good deal of power at a 3 volt operating voltage.

Figure 5A:
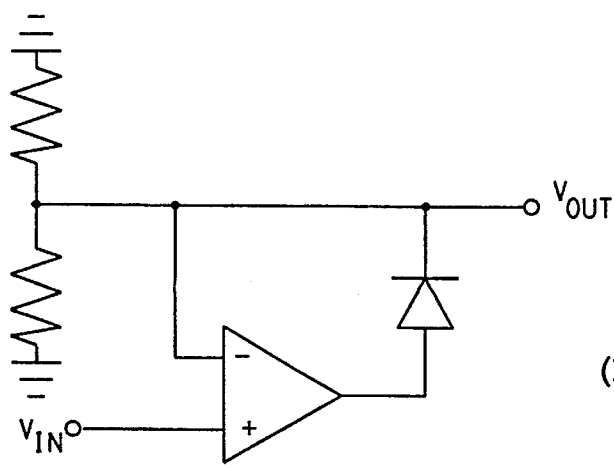
FIG. 5a shows a conventional feedback loop amplifier circuit used to create the transfer function shown in FIG. 2c.
Figure 5B:
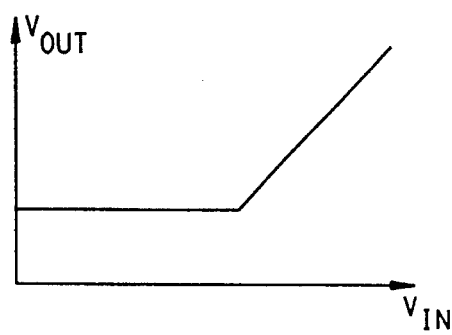

Another conventional approach is to put the diodes in a feedback loop of an operational amplifier. FIG. 5a shows one conventional circuit that achieves this, and this circuit has a transfer function shown in FIG. 5b. The output of this circuit is constant until a threshold is reached after which it has linear gain. The breakpoint is extremely sharp which is not good for image light amplifier projector applications. This type of circuit has a low bandwidth because it uses negative feedback.

Figure 6A:
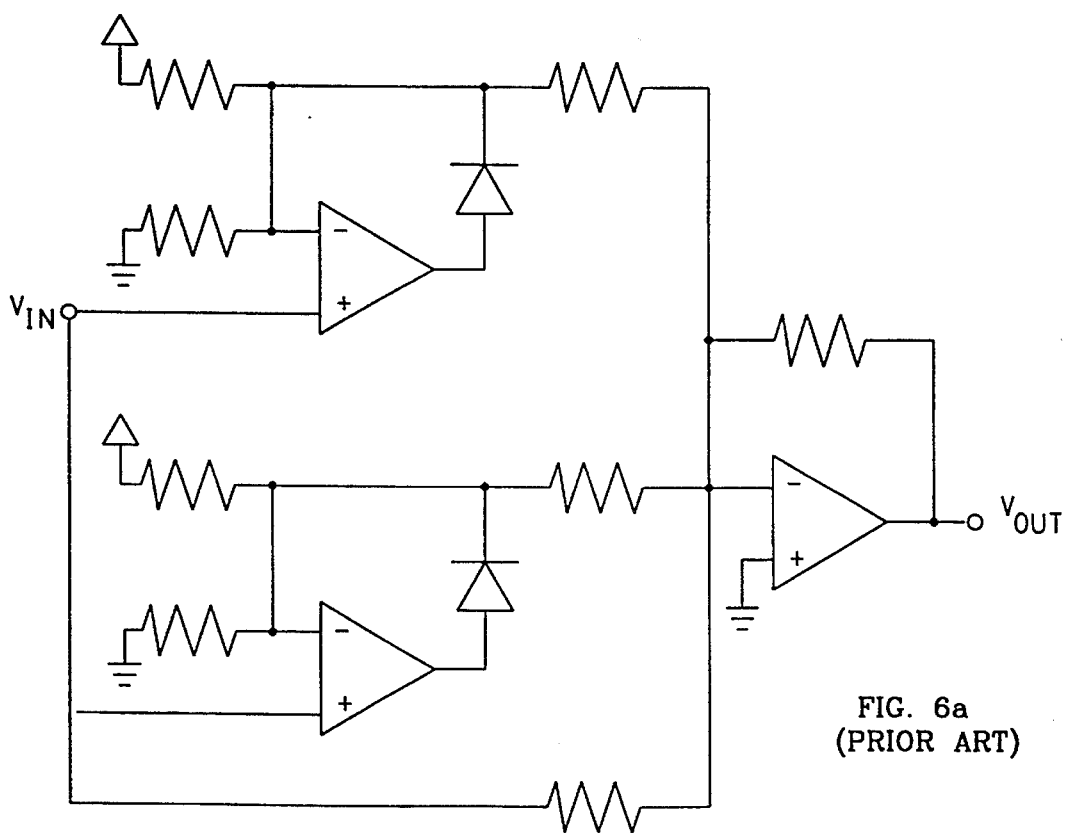
FIG. 6a shows a conventional multi-stage amplifier circuit used to create the transfer function shown in FIG. 2c.
Figure 6B:
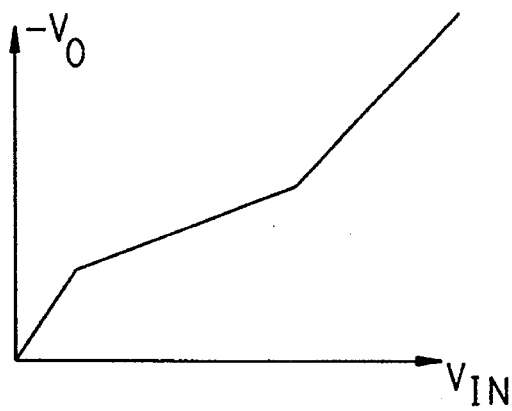

The desired transfer function may be achieved using several amplifier stages. FIG. 6a shows a three operational amplifier circuit that accomplishes this. The first two operational amplifiers use diodes in their feedback to create transfer functions similar to that shown in FIG. 5b. These transfer functions are summed together along with the input voltage in different proportions to get the composite transfer function shown in FIG. 6b. The breakpoints and gain of each stage are programmable to obtain the desired shape. Using feedback eliminates the need for large voltage swings and removes the temperature dependence of the diode voltage characteristic. However, the main drawbacks with this circuit are its sharp breakpoints and low bandwidth.

Figure 7A:
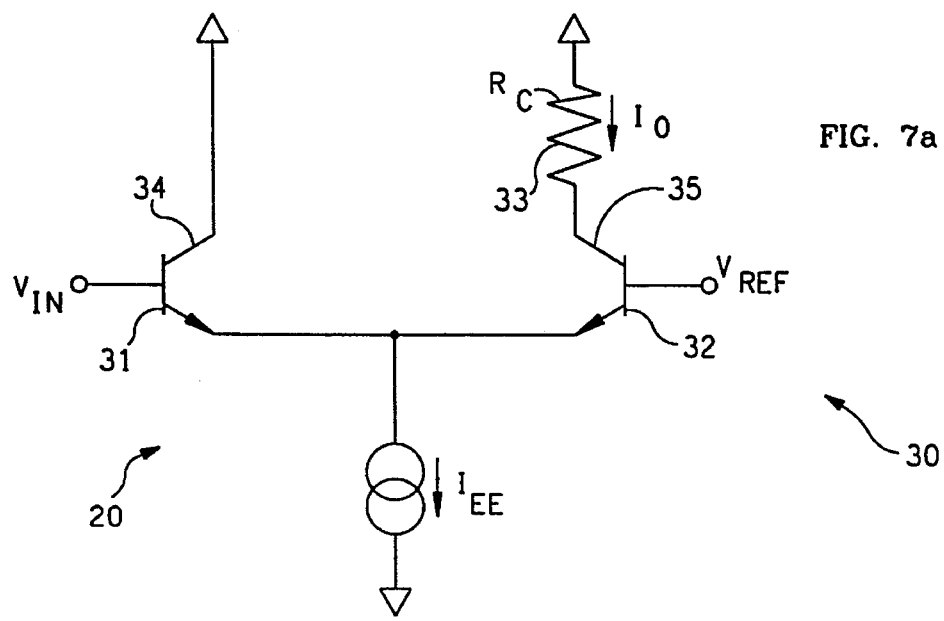
FIG. 7a shows a first gamma correction circuit in accordance with the principles of the present invention that may be employed in the projector of FIG. 1.
Figure 7B:
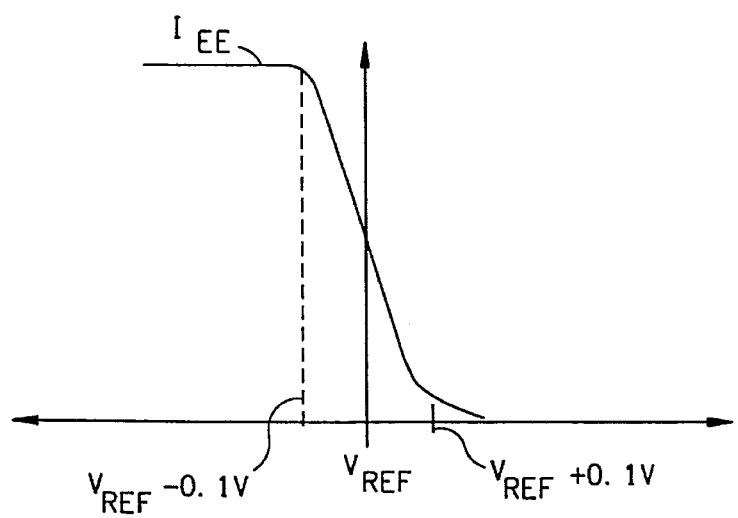

To overcome the problems associated with the above-described circuits, the gamma correction circuit 20 of the present invention is comprised of a plurality of interconnected emitter coupled pair amplifiers 30. The simplest form of one such amplifier 30 is shown in FIG. 7a, which shows an emitter coupled pair amplifier 30 that acts as a switch. The emitter coupled pair amplifier 30 is comprised of first and second transistors 31, 32 that have their emitters coupled together. Current (IEE) either flows in one collector 34 or the other collector 35 of the respective transistors 31, 32 of the emitter coupled pair amplifier 30. However, there is a small region of linear operation where both collectors 34, 35 share the current. If VIN is substantially equal to VREF, then the collectors 34, 35 share the current equally (assuming matched transistors 31,32). An output signal may be taken from either collector 34, 35, or from both collectors 34, 35 to provide signals having opposite polarity. The key is that the collectors 34, 35 are not tied together. A collector resistor 33 (RC) generates a voltage across it proportional to the collector current. The transfer function of this circuit 20 is shown in FIG. 7b. The linear range is approximately from VREF−0.1 volts to VREF+0.1 volts. The endpoints are somewhat smoothed and are not very sharp. This is a beneficial characteristic of the present gamma correction circuit 20. Once VIN is outside the linear range, the output current, or voltage across the collector resistor 33 (RC), is constant.

Figure 8A:
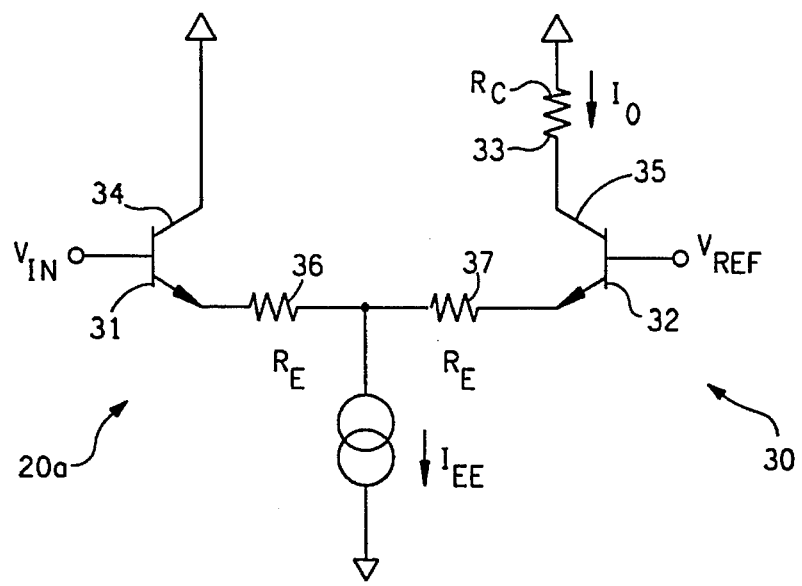
FIG. 8a shows a second gamma correction circuit in accordance with the present invention that may be employed in the projector of FIG. 1.
Figure 8B:
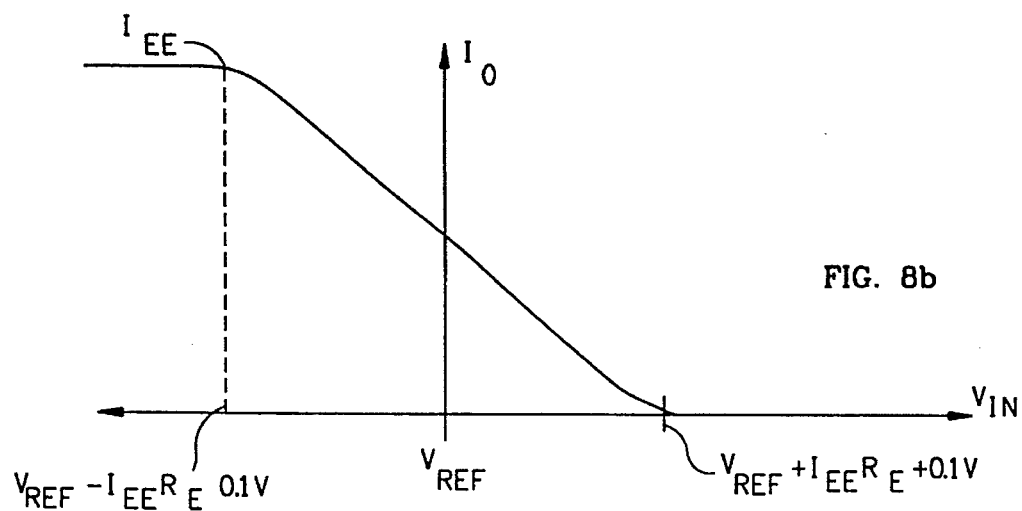

FIG. 8a shows a modified gamma correction circuit 20a, similar to the gamma correction circuit 20 of FIG. 7a, that provides greater linear range. By using resistors 36, 37 coupled to the emitters 34, 35, the range is extended. The transfer function of the gamma correction circuit 20a of FIG. 8a is shown in FIG. 8b. The linear range is from VREF minus (IEE)(RE) minus 0.1 volt to VREF plus (IEE)(RE) plus 0.1 volt. Outside of the linear range, the output voltage is constant.

Figure 9A:
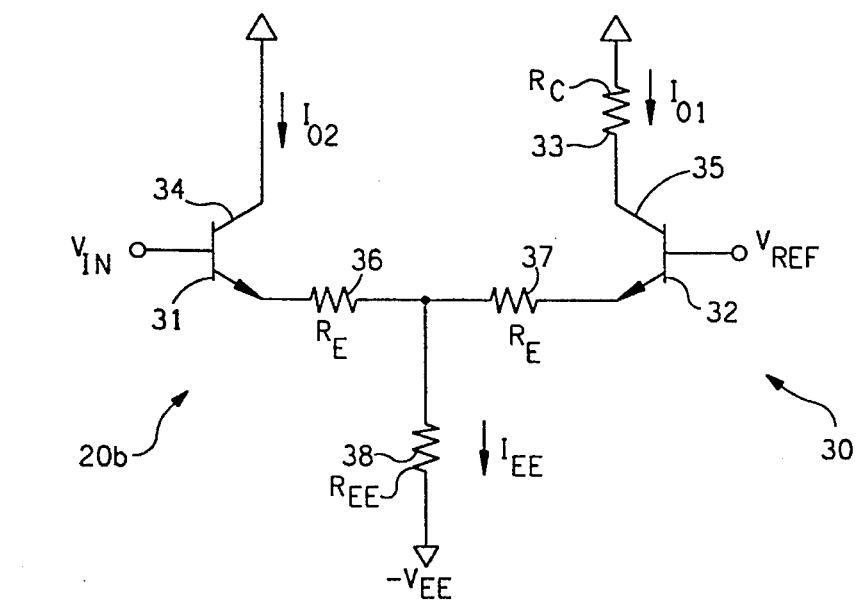
FIG. 9a shows a third gamma correction circuit in accordance with the present invention that may be employed in the projector of FIG. 1.
Figure 9B:
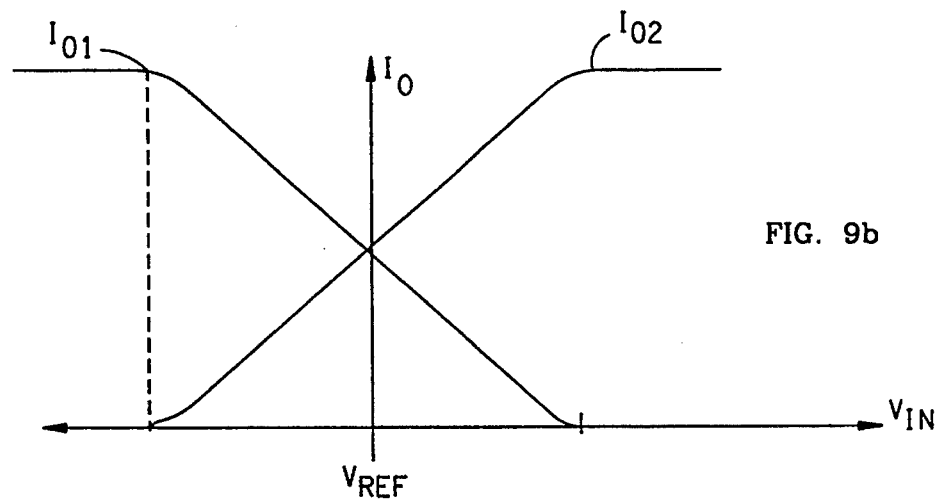

Another modification of the gamma correction circuit 20 is shown in FIG. 9a. This gamma correction circuit 20b uses a resistor 38 for the current source lEE. If a negative voltage supply is infinite in voltage, then the current source provided by the resistor 38 is constant. By using a low supply voltage, this current does not stay constant once it is outside of the linear range, but this occurs only in the collector 34, 35 on the selected input side of the circuit 20b. FIG. 9b shows that outside the linear range 101 is constant, but 102 is not. When VIN is low, 102 is constant, but when VIN is high, 102 equals IEE, and IEE changes. The right side of the circuit 20b essentially becomes an emitter follower amplifier where the emitter resistance is RE plus REE. This may be used to smooth out the transition region of the transfer function even further.

Figure 10:
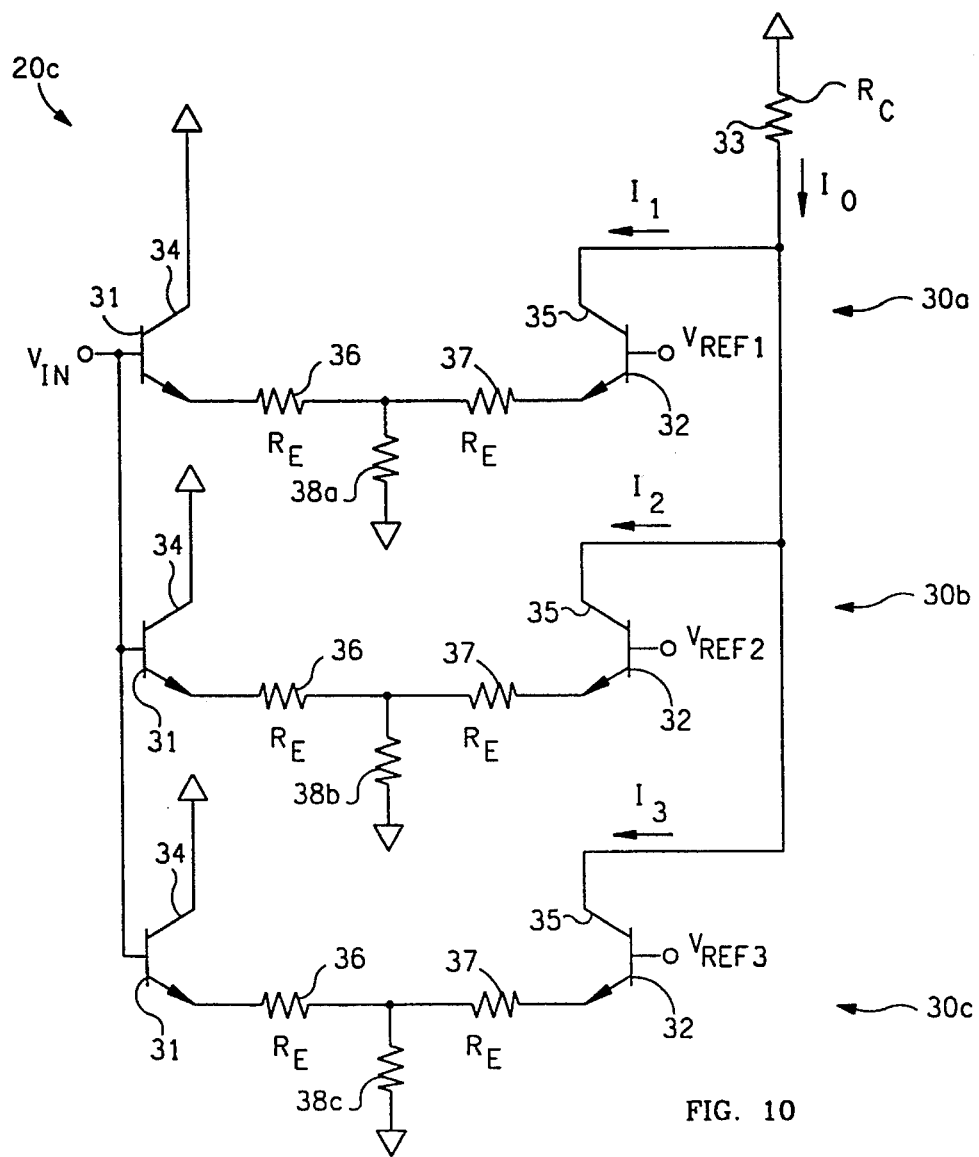
FIG. 10 shows a fourth gamma correction circuit in accordance with the present invention that is adapted for use in a liquid crystal light valve image projector manufactured by the assignee of the present invention.

FIG. 10 shows an embodiment of a gamma correction circuit 20c that is used in a Model 300 image projector manufactured by the assignee of the present invention. This gamma correction circuit 20c uses three amplifiers 30a, 30b, 30c to generate outputs illustrated by the transfer function shown in FIG. 10. Since the three amplifiers 30a, 30h, 30c provide output currents with voltage compliance, they are connected together to sum the output currents. This sum is a composite output current which is converted to a voltage across the collector resistor 33 (RC). Each amplifier 30a, 30b, 30c may be programmed to have its own gain, its own linear range, and its own reference voltage produced by resistors 38a, 38b, 38c. This gamma correction circuit 20c may be made to generate the desired transfer function as shown in FIG. 2c. It may also be modified to generate many different nonlinear transfer functions by selectively summing currents taken across either the left collector of a selected amplifier 30a, 30b, 30c. The transfer function of the left side of a selected amplifier 30a, 30b, 30c has a polarity opposite to that of the right side of the selected amplifier 30a, 30h, 30c, which may be used to "cancel" out part of the overall gain. For example, if both collectors of a selected amplifier 30a, 30b, 30c were tied together, the output thereof would be constant current and the contributions of the two sides of the selected amplifier 30a, 30b, 30c would cancel out. The left hand side of one the amplifier 30a, 30b, 30c may be used to constructively cancel out part of the gain produced by the transfer function of the right hand side of a different amplifier 30a, 30b, 30c. Thus, virtually any transfer function may be produced using many amplifiers 30 in accordance with the principles of the present invention, and the present invention is not limited to the three amplifiers 30a, 30b, 30c described above. This is also the heart of the present invention.

Figure 11A:
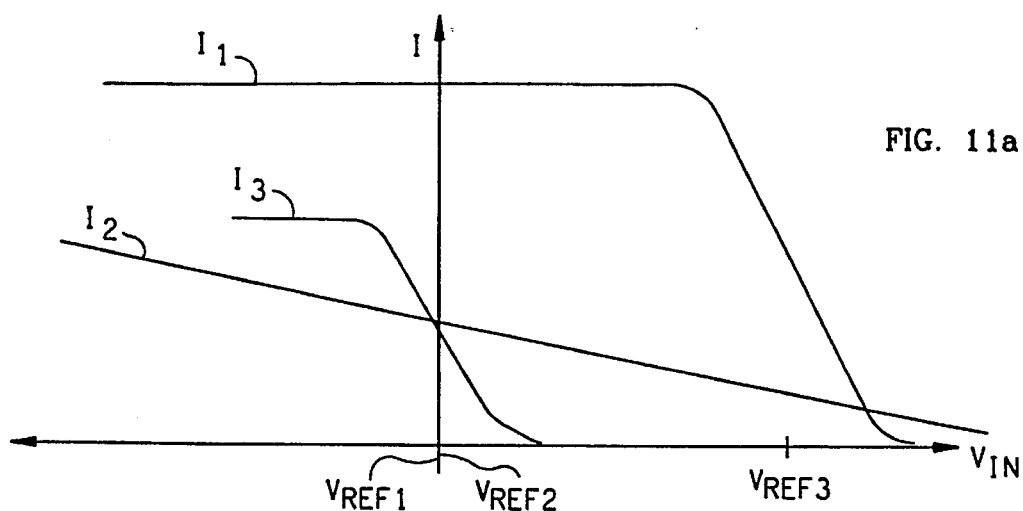
FIGS. 11a and 11b show the output response of the gamma correction circuit of FIG. 10.
Figure 11B:
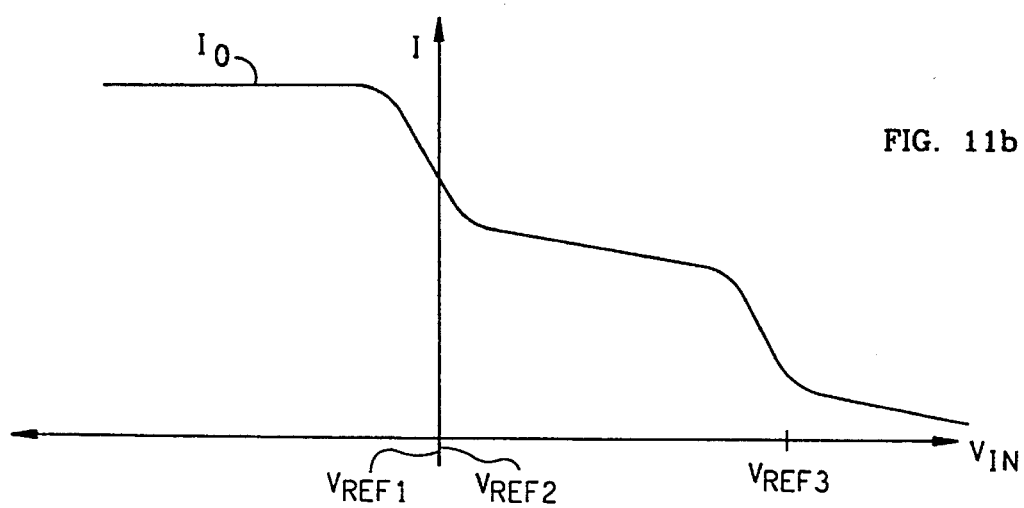
Figure 12:
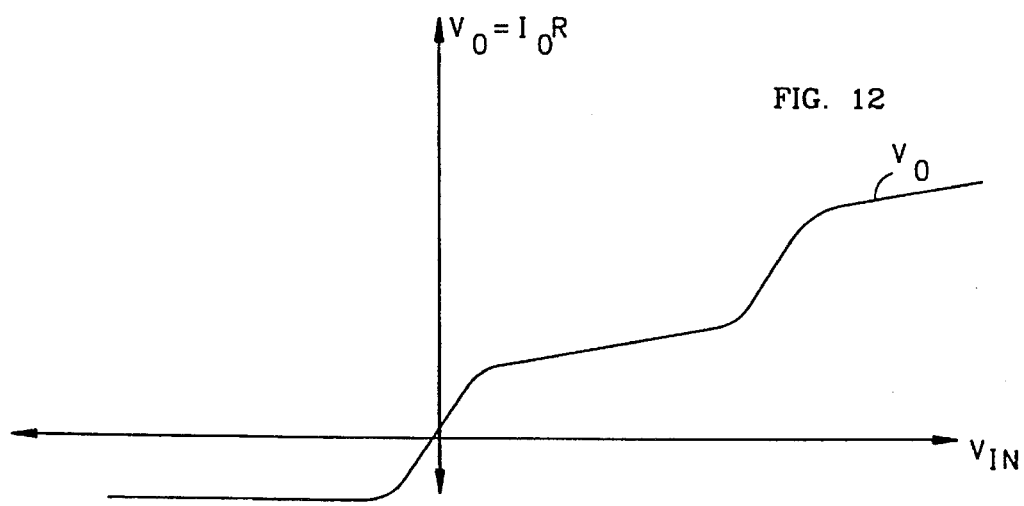
FIG. 12 shows the output response of the FIG. 12 also shows the output response of the gamma correction circuit in terms of voltage.

The gamma correction circuit 20c of FIG. 10 has an output response shown in FIGS. 11a and 11b. The response of the individual amplifier 30a, 30b, 30c is shown in FIG. 11a and their composite sum in FIG. 11b. The output voltage across the collector resistor 33 (RC) then has the exact shape and polarity as shown in FIG. 2c. FIG. 12 also shows the output response of the gamma correction circuit 20 in terms of voltage, which corresponds to the desired function shown in FIG. 2c. The formulas used to calculate the current values are given by IEE=[(gain)(2)(VH−VR)]/RC, and RE=(VH−VR−0.1) /IEE.

Once the desired output shape of the transfer function is determined, a number of line segments may be created to linearly approximate it. This determines the number of breakpoints and the number of amplifiers 30. The gain for each line section, and the range for each amplifier 30 is then determined. The gain is the parameter for the slope of the desired system transfer function., corresponding to VO/VIN. Once the straight line approximation is determined, the gain is set, as are VH and VR. Then the equations above are applied to obtain the desired values. The above equations use VH for the high end of the linear region and VR for VREF.

It is to be understood that the amplifiers described above are generally well known in the art and may be readily constructed to implement the various gamma correction circuits 20 in accordance with the teachings of the present invention. FIG. 12 shows the output response of the graph of FIG. 10 in terms of voltage. The benefits of the gamma correction circuit 20 are high bandwidth capabilities, smooth breakpoints, temperature compensation, low voltage breakpoint capability, and its programmability for many different transfer function shapes. The high bandwidth results from the fact the each differential amplifier 30 has a fixed gain and does not need feedback to set it, and hence comprises an open loop amplifier. Using two transistors 31, 32 in each amplifier is also faster than using operational amplifiers. The present invention is also very well-suited for integrated circuit fabrication.

Figure 13:
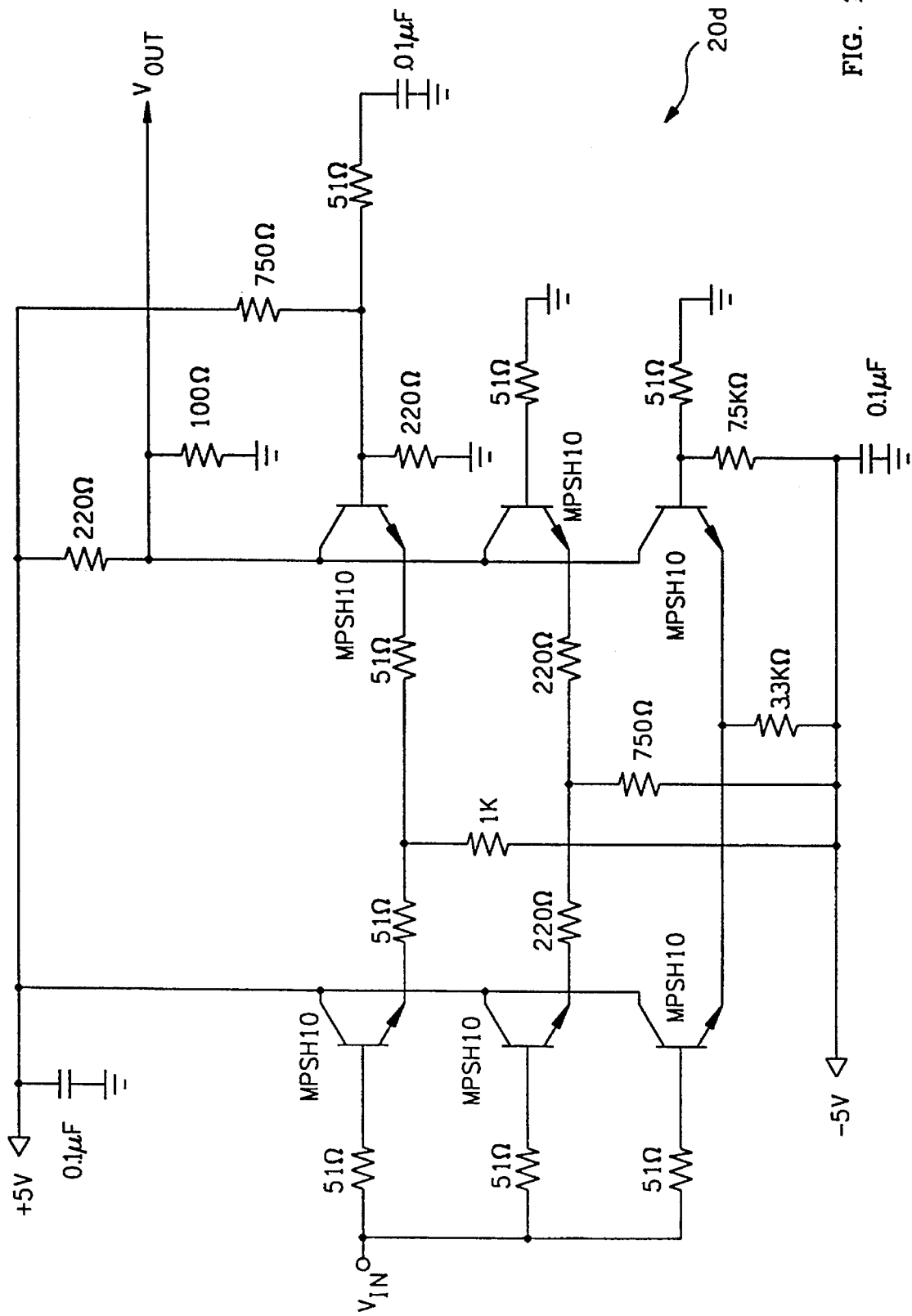
FIG. 13 shows details of an embodiment of the gamma correction circuit of the present invention implemented in one image projector manufactured by the assignee of the present invention.

The gamma correction circuit 20c of FIG. 11a was simulated using a well-known SPICE simulation program. The transfer function derived from the simulation was nearly perfect with very smooth breakpoints. A gamma correction circuit 20d developed using the SPICE simulation program was constructed and test data was measured. This gamma correction circuit 20d is shown in FIG. 13, which also shows resistor and capacitor values for the components along with the model of the transistors used therein. The test results using the constructed gamma correction circuit 20d were virtually identical to the output of the SPICE simulation. The gamma correction circuit 20d shown in FIG. 13 is adapted for use in a Model 300 image projector manufactured by the assignee of the present invention.

Figure 14:
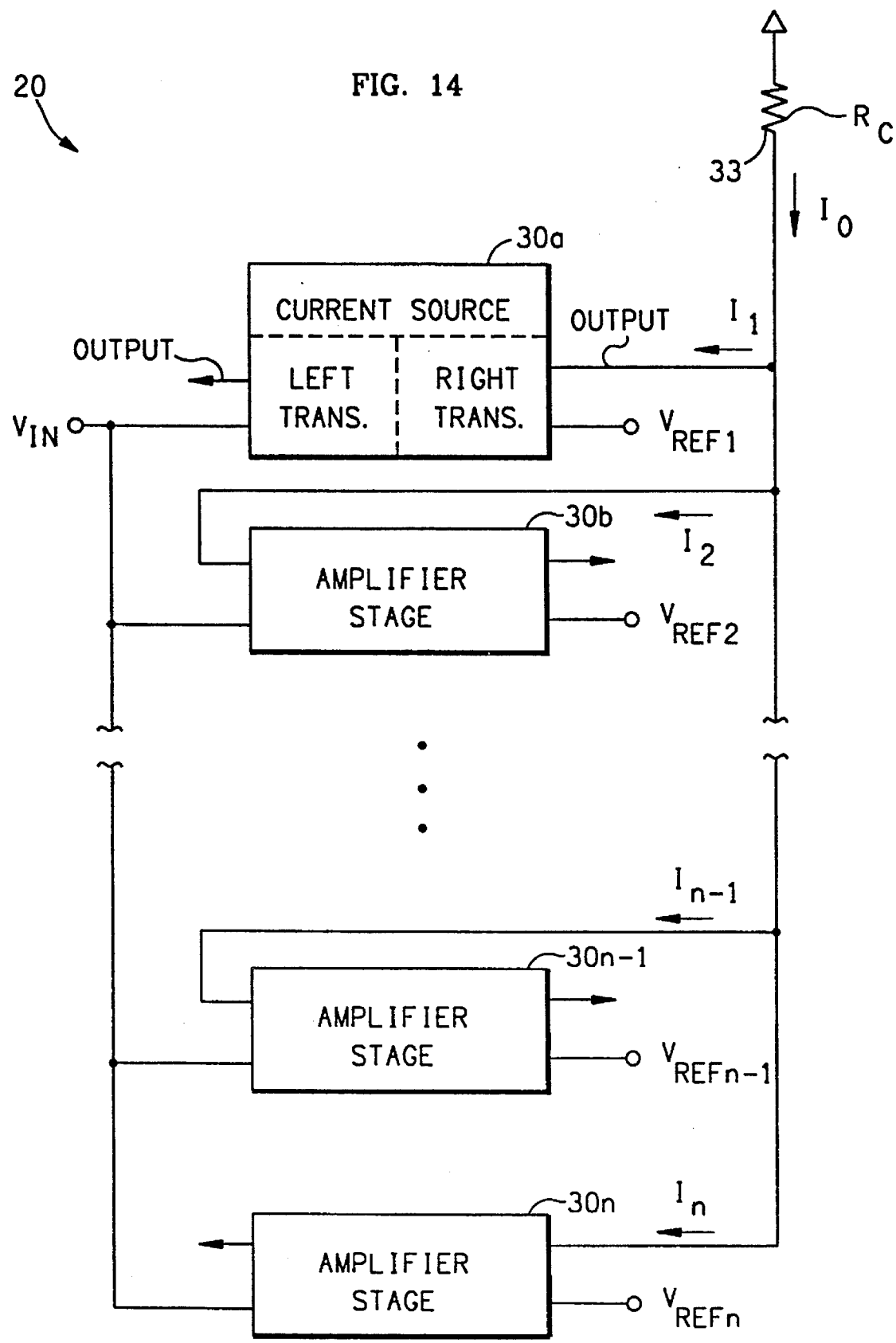
FIG. 14 shows a generic embodiment of the present invention.

FIG. 14 shows a generic embodiment of the gamma correction circuit 20 of the present invention. The gamma correction circuit 20 shown in FIG. 14 includes a plurality of amplifier stages 30a–30n, and outputs from selected left and right side transistors thereof are coupled to provide an appropriate summed current output across an optional output resistor 33. The outputs of the unused sides of the respective amplifier stages 30a–30n are shown with an arrow. In general, the generic gamma correction circuit 20 comprises two transistors, two resistors and a current source, as has been described above with respect to other drawing figures.

An improvement of the gamma correction circuitry involves dynamically correcting the gamma transfer function when gamma correction circuitry is used in conjunction with circuitry for correcting the threshold or black level due to nonuniformities in liquid crystal device.

Figure 15:
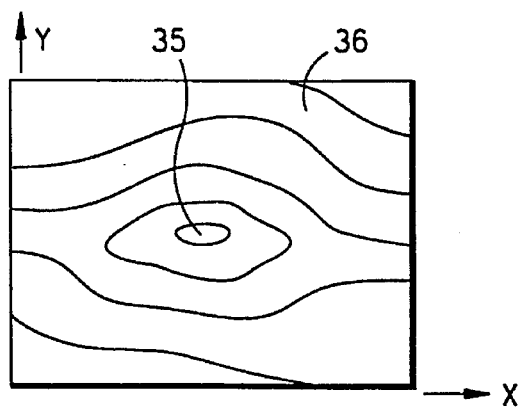
FIG. 15 is a isolinear diagram of the input to a liquid crystal light valve.

The spatial brightness uniformity of a liquid crystal is not flat. That is, some parts or areas of the liquid crystal are more sensitive than others. One cause of this nonuniformity is the threshold point at which the device begins reflecting output light and the other is the amount of light needed for a full turn on. These can be referred to as the black and white levels. Since the surface area of the liquid crystal light valve is relatively large, the thin film layer are not uniform. Some parts of the layer are thicker or thinner than others. This changes the transfer function of the light valve. An illustration of this is in FIG. 15 which is an isolinear diagram of what a typical liquid crystal light valve might look like. The center portion 35 can turn on with less addressing light than the outer areas 36. This can be called spatial shading or nonuniformity.

To correct this a bit map is created corresponding to the writing surface input of the liquid crystal light valve. Each portion of the writing surface of a liquid crystal light valve has a corresponding position in the bit map. For each position on the light valve the required threshold bias voltage is determined by imperical measurement. Once the proper black level is determined for each area of the liquid crystal light valve input surface then the necessary correction information is stored in the bit map and the information is used every time that portion of the light valve input surface is being written to by the beam from, for instance, a CRT. With reference to FIG. 1, the threshold correction takes place in the amplifier 21 wherein the threshold correction signal fed into the amplifier 21 at the correct time so when the beam of the CRT is scanning the liquid crystal light valve writing surface the correction threshold correction information is being fed to amplifier 21 from the bit map.

Figure 16:
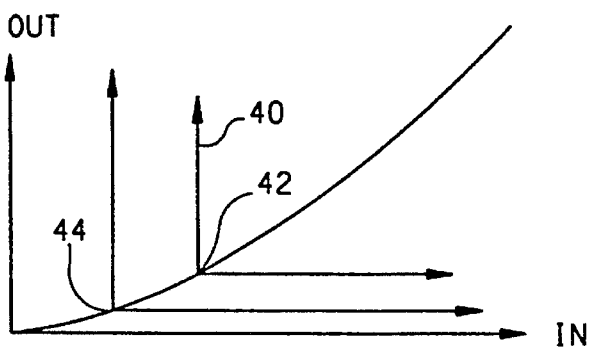
FIG. 16 is a graph showing the drive function for a CRT.

The problem is that this threshold or dynamic threshold correction adversely affects the differential gamma or color balance. This problem arises from the fact that the CRT transfer function changes with threshold correction. This is shown in FIG. 16. The graph in FIG. 16 shows the normal input drive voltage verses the output light for the CRT. This curve is approximately the drive voltage to the power of 2.2. In a liquid crystal light valve projector the black level on the screen is not the same as the black level on the CRT. In FIG. 16, the vertical axis represents light out from the CRT and the horizontal axis represents input voltage. The black level of the light valve occurs at some point where there is a small amount of CRT light. The upper axis 40 is for a light valve that needs a lot of threshold correction. If threshold is used to correct for the light valve then we use 0.42 on the curve as the black level for the light valve. However, at another point on the writing surface of the liquid crystal light valve, it is more sensitive, which is in area 41 of FIG. 15, then a lower threshold voltage is necessary represented by 0.44 on the curve shown in FIG. 16. The difference between these three transfer functions is the slope near zero. For a CRT the slope of the drive curve is virtually zero. For a normal liquid crystal light valve the slope of the drive curve is finite and for the bad part of a liquid crystal light valve the slope is even greater. It is this change in the threshold which moves the zero point on the CRT transfer function wherein zero is defined by black level on the screen and not by beam current.

The present invention compensates for this distortion by dynamically changing the gamma transfer function by injecting the threshold correction signal into one of the amplifiers used to generate the gamma transfer function curve.

The basic invention is to take the signal which determines the threshold bias level of the liquid crystal light valve and use it to change the slope of the gamma correction transfer curve. This results in a self-compensating system in that the gamma correction stays relatively constant with changes in threshold bias.

Figure 17:
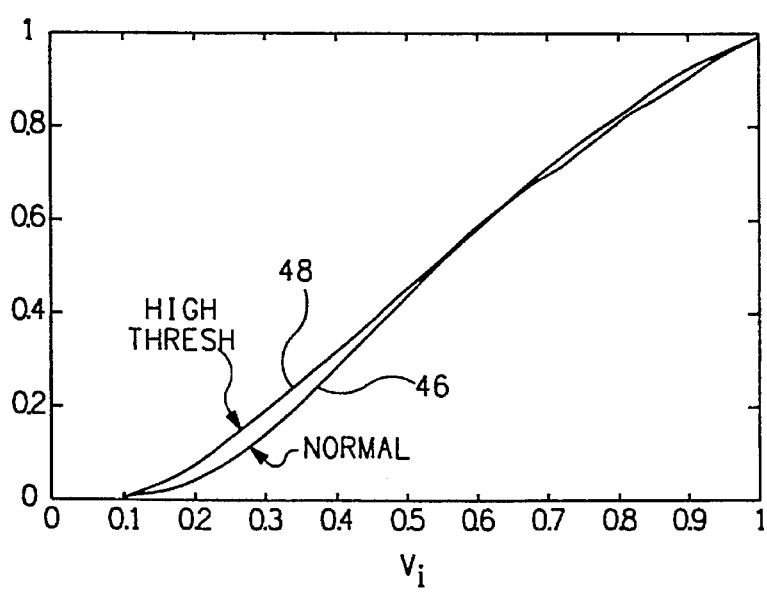
FIG. 17 is a graph showing the variation in gamma correction when the threshold bias is varied.
Figure 18:
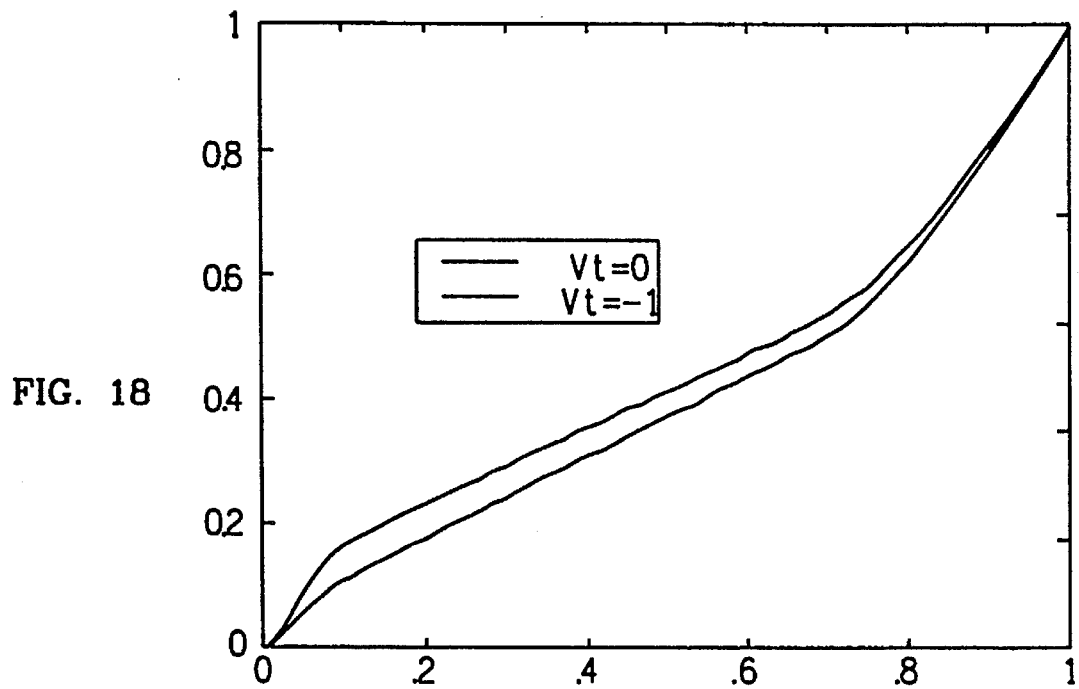
FIG. 18 is a graph showing the change in output of the gamma correction circuit when the threshold voltage is varied.

FIG. 17 shows the combined transfer function for the CRT and the liquid crystal light valve when there is normal threshold correction and when there is high threshold correction. Curve 46 represents the transfer curve for the CRT and light valve when there is normal threshold correction and curve 48 represents the transfer function for the CRT and light valve when there is high threshold correction. These curves are slightly differently and therefore require different compensation. The electrical gamma correction circuit shape is calculated by knowing the desired output characteristic which is a linear output and knowing the input signal characteristic. The required gamma correction circuitry is then calculated by solving for the transfer function of the system that will produce the desired output characteristic. This was done for the two cases of the normal and high threshold levels. The curves obviously split apart at the lower gray levels. It was found imperically that similar curves could be made by changing the reference voltage of one of the emitter couple pairs in the gamma correction circuit shown in FIG. 13. FIG. 18 shows the transfer function for the gamma circuit shown in FIG. 22. On the horizontal axis is voltage into the gamma circuit and on the vertical axis is voltage out of the gamma correction circuit.

Figure 19:
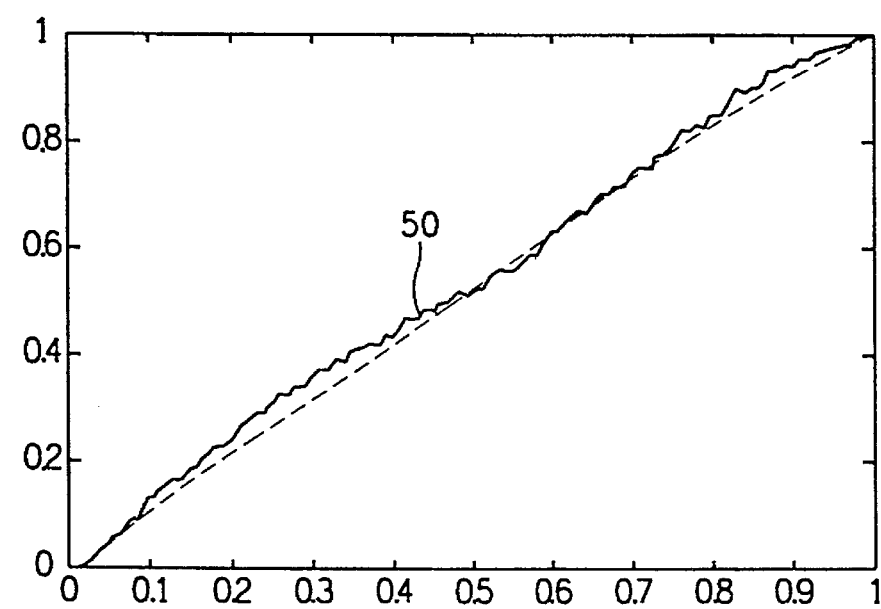
FIG. 19 is a graph showing the output of the projector with no threshold correction.
Figure 20:
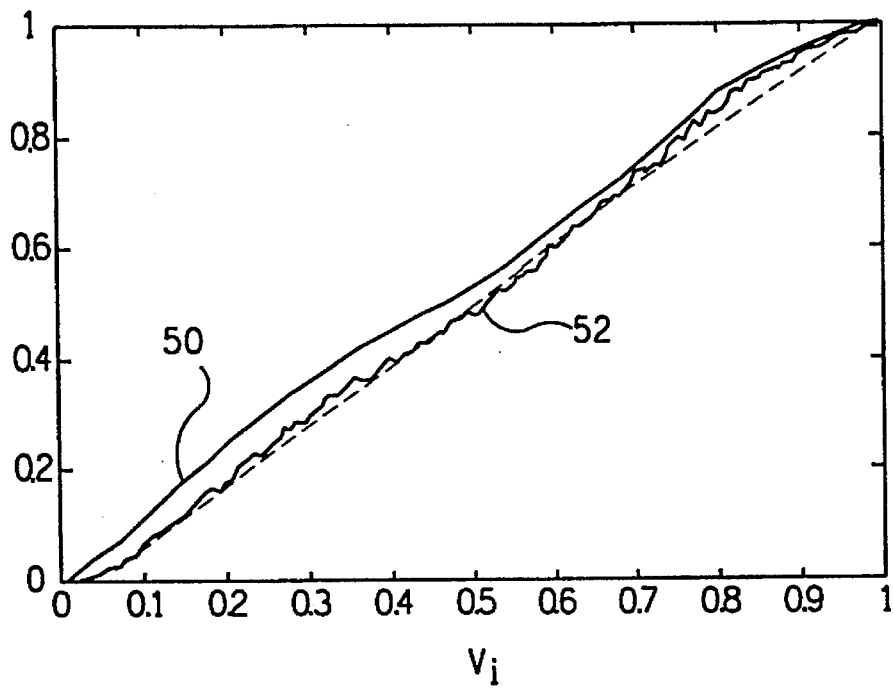
FIG. 20 is a graph comparing outputs of the projector.
Figure 21:
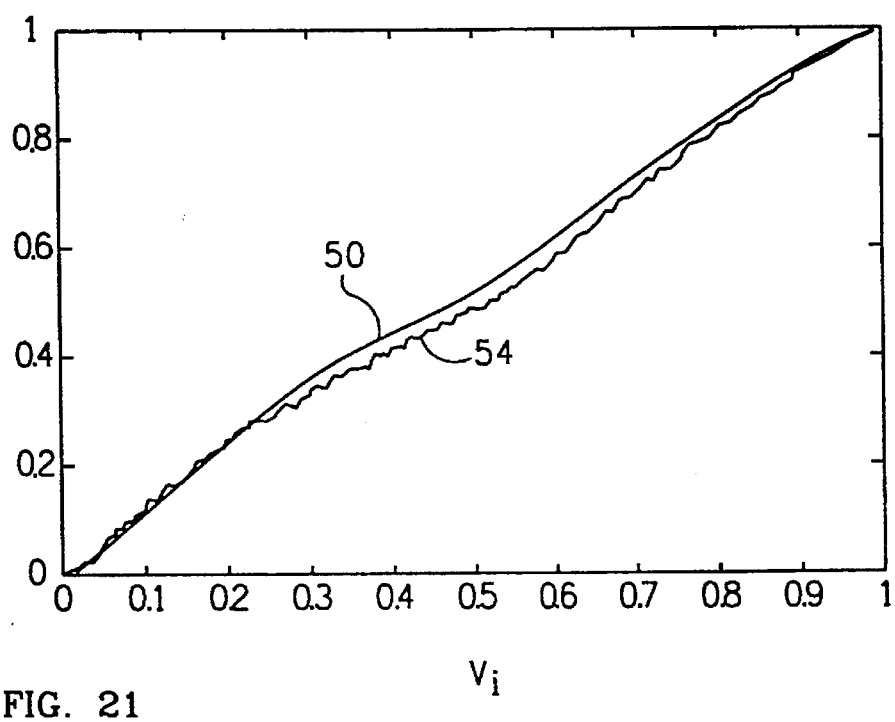
FIG. 21 is another graph showing the output of the projector under various threshold conditions when the invention is used.

To confirm this result the two curves were tested with known normal and high threshold CRT/ light valve data. FIGS. 19, 20 and 21 show the effect of applying the threshold correction voltage to one portion of the gamma correction amplifier circuitry. FIG. 19 shows the output of the projector when a normal threshold bias is used. Ideally, this curve 50 in FIG. 19 would be a straight line which would indicate that there was a linear gray scale or overall linear transfer function taking into account the characteristics of the input signal and the overall transfer function of the projector. FIG. 20 is a graph of the output of the projector when a high threshold correction is used. For comparison, curve 50 or the normal characteristics of the projector output is compared to curve 52 which results when a high threshold correction signal is applied to the amplifier 21 in FIG. 1. FIG. 21 shows the output of the projector when the threshold correction signal is also applied to one portion of the gamma correction amplifier circuitry. This results in a projector output which is shown by curve 54 in FIG. 21. As shown in FIG. 21, there is much less difference between the two curves 50 and 54 than there is between the curves 50 and 52. This results in better gamma correction between areas of the liquid crystal light valve that require normal threshold correction and those areas of the liquid crystal light valve that require high threshold correction.

Figure 22:
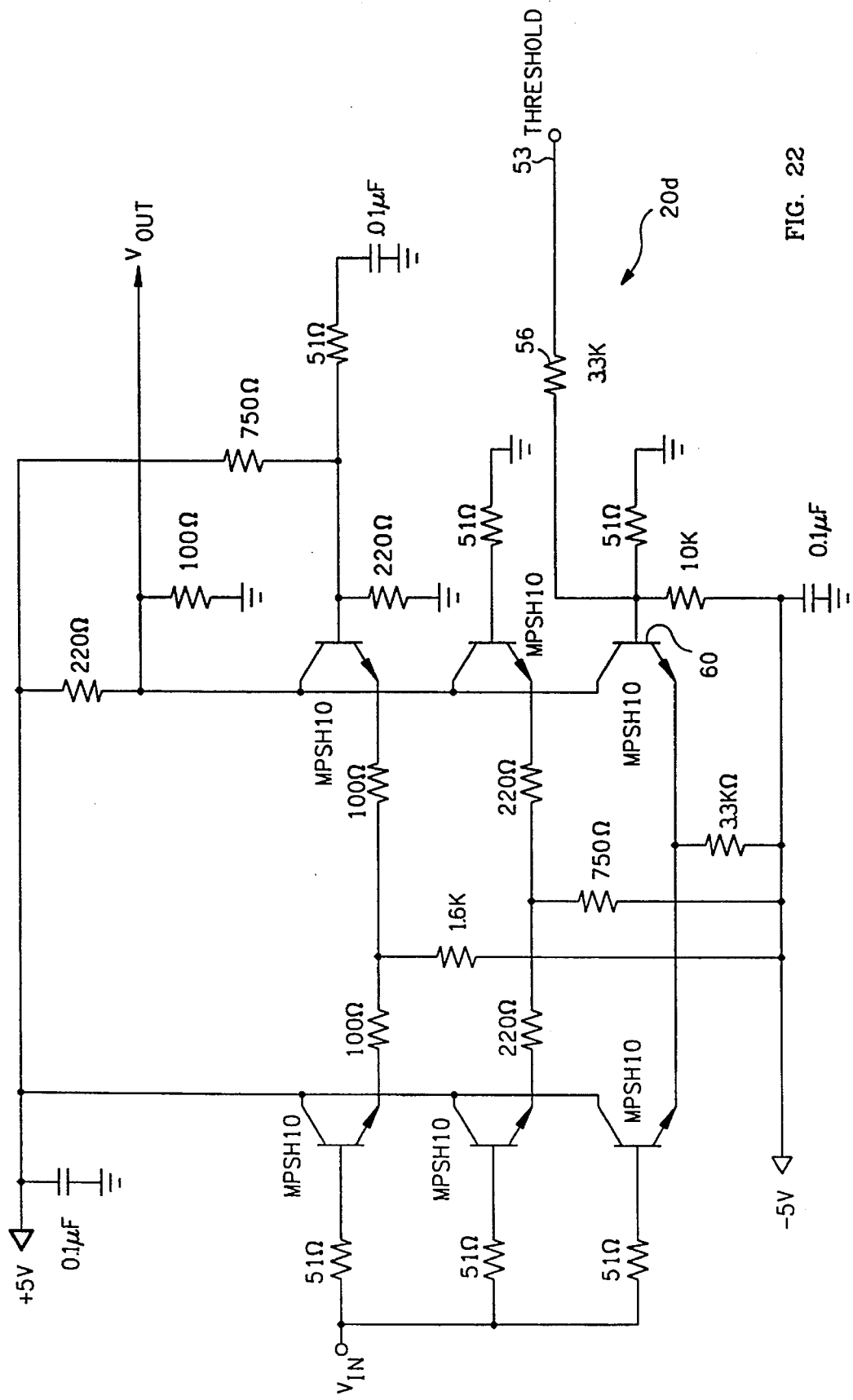
FIG. 22 shows modifications to the circuit shown in FIG. 13 that are used to make dynamic corrections to the gamma correction circuitry.

FIG. 22 is an updated circuit diagram of FIG. 13 which shows the gamma correction amplifiers and how the threshold correction signal is applied to the gamma correction circuitry. The threshold correction signal is supplied on line 58 to resistor 56 which in turn applies the threshold correction signal to the base of transistor 60. The threshold correction voltage, when applied at this point in the circuit, produces the curves that are shown in FIG. 21. Namely, when normal threshold correction is applied curve 50 results and when high threshold correction is applied curve 54 results. As shown, the difference between these two curves is much less than the difference between the curves 50 and 52 shown in FIG. 20, which results in an improved image from the projector.

Thus there has been described new and improved gamma correction circuits for use with nonlinear light modulators and image projectors that correct the grey scale linearity of images displayed thereby. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

For example, the present gamma correction circuit may be adapted to correct the system transfer function of any system employing nonlinear control. Such systems include sine wave shaping circuits, logarithmic amplifiers, liquid crystal based systems, analog sensor systems, such as a thermocouple-based transducer, deflection circuits requiring linearity correction, feedback circuits requiring linearity control, deformable membranes, or piezoelectric light transducers, for example.

What is claimed is:

1. A dynamic gamma correction apparatus for use in an image projector comprising an image source and a nonlinear light modulator, said apparatus comprising:

a plurality of amplifiers that are coupled together so as to sum their respective output currents to provide a composite output current, wherein each amplifier comprises at least two transistors and wherein each of the plurality of amplifiers is adapted to implement a predetermined individual transfer function, and wherein the plurality of amplifiers comprise a plurality of current sources that provide differing levels of current to form the composite output current and that cooperate to provide each predetermined individual transfer function;

dynamic compensation means having a signal connected to some part of at least one of said amplifiers to dynamically alter the shape of the gamma correction curve;

an output means adapted to convert the composite output current into a corresponding output voltage of the apparatus;

wherein the combination of amplifiers and current sources is configured to compensate for nonlinearity of the image projector due to the combination of the image source and a nonlinear light modulator; and wherein each of at least two of said amplifiers includes a separate reference voltage input node for application of a reference voltage to selectively alter the transfer function of the associated individual amplifier, wherein said plurality of amplifiers are configured to generate a substantially smooth and continuous gamma correction transfer function having regions of both positive and negative change in slope.

2. The gamma correction apparatus of claim 1 wherein each of the plurality of amplifiers comprises first and second emitter coupled transistors.

3. The gamma correction apparatus of claim 1 wherein each of the plurality of current sources includes a resistor.

4. The gamma correction apparatus of claim 2 wherein each of the plurality of current sources includes a resistor.

5. The gamma correction apparatus of claim 2 wherein different predetermined transfer functions are provided by selectively coupling the output current derived from the first and second emitter coupled transistors to produce differing transfer functions depending upon the particular transistors that are selected.

6. The gamma correction apparatus of claim 3 wherein different predetermined transfer functions are provided by selectively coupling the output current derived from a selected one of the transistors to the resistor, which selective coupling produces differing transfer functions depending upon the particular transistors that are selected.

7. The gamma correction apparatus of claim 4 wherein different predetermined transfer functions are provided by selectively coupling the output current derived from a selected one of the first and second emitter coupled transistors to the resistor, which selective coupling produces differing transfer functions depending upon the particular transistors that are selected.

8. The gamma correction apparatus of claim 1 wherein the nonlinear light modulator comprises a liquid crystal light valve.

9. A dynamic gamma correction apparatus for use in an image projector comprising a cathode ray tube and a liquid crystal light valve, said apparatus comprising:

a plurality of amplifiers that are coupled together so as to sum their respective output currents to provide a composite output current, wherein each amplifier comprises at least two transistors and wherein each of the plurality of amplifiers is adapted to implement a predetermined individual transfer function, and wherein the plurality of amplifiers comprise a plurality of current sources that provide differing levels of current to form the composite output current and that cooperate to provide each predetermined individual transfer function;

dynamic compensation means having a signal connected to some part of at least one of said amplifiers to dynamically alter the shape of the gamma correction curve;

an output means adapted to convert the composite output current into a corresponding output voltage of the apparatus;

wherein the combination of amplifiers and current sources is configured to compensate for nonlinearity of the image projector due to the combination of the cathode ray tube and the liquid crystal light valve; and wherein each of at least two of said amplifiers includes a separate reference voltage input node for application of a reference voltage to selectively alter the transfer function of the associated individual amplifier, wherein said plurality of amplifiers are configured to generate a substantially smooth and continuous gamma correction transfer function having regions of both positive and negative change in slope.

10. The gamma correction apparatus of claim 9 wherein each of the plurality of amplifiers comprises first and second emitter coupled transistors.

11. The gamma correction apparatus of claim 9 wherein each of the plurality of current sources includes a resistor.

12. The gamma correction apparatus of claim 10 wherein each of the plurality of current sources includes a resistor.

13. The gamma correction apparatus of claim 10 wherein different predetermined transfer functions are provided by selectively coupling the output current derived from the first and second emitter coupled transistors to produce differing transfer functions depending upon the particular transistors that are selected.

14. The gamma correction apparatus of claim 11 wherein different predetermined transfer functions are provided by selectively coupling the output current derived from a selected one of the transistors to the resistor, which selective coupling produces differing transfer functions depending upon the particular transistors that are selected.

15. The gamma correction apparatus of claim 12 wherein different predetermined transfer functions are provided by selectively coupling the output current derived from a selected one of the first and second emitter coupled transistors to the resistor, which selective coupling produces differing transfer functions depending upon the particular transistors that are selected.

16. A dynamic gamma correction apparatus for use in an image projector comprising a cathode ray tube and a liquid crystal light valve, said apparatus comprising:

a plurality of amplifiers wherein each amplifier comprises first and second emitter coupled transistors that are coupled together so as to sum their respective output currents to provide a composite output current, and wherein each of the plurality of amplifiers is adapted to implement a predetermined individual transfer function, and wherein the plurality of amplifiers comprise a plurality of current sources that provide differing levels of current to form the composite output current and that cooperate to provide each predetermined individual transfer function;

dynamic compensation means having a signal connected to some part of at least one of said amplifiers to dynamically alter the shape of the gamma correction curve;

an output means adapted to convert the composite output current into a corresponding output voltage of the apparatus;

wherein the combination of amplifiers and current sources is configured to compensate for nonlinearity of the image projector due to the combination of the cathode ray tube and the liquid crystal light valve; and wherein each of at least two of said amplifiers includes a separate reference voltage input node for application of a reference voltage to selectively alter the transfer function of the associated individual amplifier, wherein said plurality of amplifiers are configured to generate a substantially smooth and continuous gamma correction transfer function having regions of both positive and negative change in slope.

17. The gamma correction apparatus of claim 16 wherein each of the plurality of current sources includes a resistor.

18. The gamma correction apparatus of claim 16 wherein different predetermined transfer functions are provided by selectively coupling the output current derived from the first and second emitter coupled transistors to produce differing transfer functions depending upon the particular transistors that are selected.

19. The gamma correction apparatus of claim 17 wherein different predetermined transfer functions are provided by selectively coupling the output current derived from a selected one of the first and second emitter coupled transistors to the resistor, which selective coupling produces differing transfer functions depending upon the particular transistors that are selected.

\* \* \* \* \*

UNITED STATES PATENT AND TRADEMARK OFFICE
CERTIFICATE OF CORRECTION

PATENT NO. : 5,461,430
DATED : Oct. 24, 1995
INVENTOR(S) : James G. Hagerman

It is certified that error appears in the above-indentified patent and that said Letters Patent is hereby corrected as shown below:

Title page, item [73]: Assignee: should be --Hughes-JVC Technology Corporation, Carlsbad, California--

Signed and Sealed this

Thirteenth Day of August, 1996

*Attest:*

BRUCE LEHMAN

*Attesting Officer*        *Commissioner of Patents and Trademarks*

UNITED STATES PATENT AND TRADEMARK OFFICE
CERTIFICATE OF CORRECTION

PATENT NO. : 5,461,430
DATED : Oct. 24, 1995
INVENTOR(S) : James G. Hagerman

It is certified that error appears in the above-indentified patent and that said Letters Patent is hereby corrected as shown below:

On the title page, insert:

Item [73]: Assignee: should be --Hughes-JVC Technology Corporation, Carlsbad, California--

Signed and Sealed this

Eighth Day of October, 1996

Attest:

BRUCE LEHMAN

*Attesting Officer*   *Commissioner of Patents and Trademarks*